United States Patent
Hong

(10) Patent No.: US 12,185,415 B2
(45) Date of Patent: Dec. 31, 2024

(54) NETWORK SWITCHING RESOURCE DETERMINING METHOD AND NETWORK SWITCHING RESOURCE CONFIGURATION METHOD

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 530 days.

(21) Appl. No.: 17/605,215

(22) PCT Filed: Apr. 25, 2019

(86) PCT No.: PCT/CN2019/084315
§ 371 (c)(1),
(2) Date: Oct. 20, 2021

(87) PCT Pub. No.: WO2020/215278
PCT Pub. Date: Oct. 29, 2020

(65) Prior Publication Data
US 2022/0225473 A1 Jul. 14, 2022

(51) Int. Cl.
*H04W 76/34* (2018.01)
*H04W 76/15* (2018.01)
*H04W 88/06* (2009.01)

(52) U.S. Cl.
CPC ......... *H04W 76/34* (2018.02); *H04W 76/15* (2018.02); *H04W 88/06* (2013.01)

(58) Field of Classification Search
CPC ... H04W 8/183; H04W 48/18; H04W 60/005; H04W 60/04; H04W 76/15; H04W 76/34; H04W 88/06
See application file for complete search history.

(56) References Cited

U.S. PATENT DOCUMENTS 8,224,233 B2 * 7/2012 Brisebois ............ H04W 48/04
455/1
8,452,305 B2 * 5/2013 Brisebois ............ H04W 24/00
455/456.1

(Continued)

FOREIGN PATENT DOCUMENTS

CN 104094656 A 10/2014
CN 105813214 A 7/2016
(Continued)

OTHER PUBLICATIONS

Extended European Search Report issued in Application No. 19926569.5, dated Nov. 15, 2022,(16p).
(Continued)

*Primary Examiner* — Eric Nowlin
(74) *Attorney, Agent, or Firm* — Arch & Lake LLP

(57) ABSTRACT

A method, apparatus, and a storage medium for determining a network switching resource are provided. The method may be applied to a terminal. The terminal may send, when establishing connection to a first operator network in at least two operator networks, pre-stored first information of a second operator network in the at least two operator networks, and second information of a terminal in the second operator network to the first operator network. The terminal may determine time-domain resources for disconnection to the first operator network and activities in the second operator network according to first configuration information sent by the first operator network and/or second configuration information sent by the second operator network after establishing communication connection to the second operator network.

20 Claims, 9 Drawing Sheets

(56) References Cited

U.S. PATENT DOCUMENTS

| | | | | |
|---|---|---|---|---|
| 8,761,661 | B2 * | 6/2014 | Brisebois | H04K 3/42 455/1 |
| 8,897,694 | B2 * | 11/2014 | Brisebois | H04K 3/86 455/1 |
| 8,909,290 | B2 * | 12/2014 | Ruvalcaba | H04W 8/183 455/418 |
| 8,934,460 | B1 * | 1/2015 | Hu | H04W 76/15 370/252 |
| 9,088,386 | B2 * | 7/2015 | Brisebois | H04W 24/00 |
| 9,369,932 | B2 * | 6/2016 | Wu | H04W 60/04 |
| 9,504,057 | B2 * | 11/2016 | Ahmadi | H04W 72/1215 |
| 9,838,915 | B2 * | 12/2017 | Wu | H04W 60/00 |
| 9,942,746 | B2 * | 4/2018 | Russell | H04W 8/18 |
| 10,028,149 | B2 * | 7/2018 | Zhao | H04W 16/14 |
| 10,524,113 | B2 * | 12/2019 | Russell | H04W 8/18 |
| 10,548,017 | B2 * | 1/2020 | Ku | H04W 48/20 |
| 10,893,453 | B2 * | 1/2021 | Ngai | H04W 72/53 |
| 11,134,370 | B2 * | 9/2021 | Lee | H04W 28/24 |
| 11,202,253 | B2 * | 12/2021 | Russell | H04L 61/3015 |
| 11,212,663 | B2 * | 12/2021 | Lauster | H04W 76/11 |
| 11,259,171 | B2 * | 2/2022 | Lauster | H04W 60/00 |
| 2011/0086614 | A1 | 4/2011 | Brisebois | H04W 52/245 455/411 |
| 2012/0244794 | A1 * | 9/2012 | Brisebois | H04W 48/02 455/1 |
| 2013/0237142 | A1 * | 9/2013 | Brisebois | H04W 24/00 455/1 |
| 2013/0237197 | A1 * | 9/2013 | Ruvalcaba | H04W 8/183 455/418 |
| 2013/0294412 | A1 * | 11/2013 | Wang | H04W 16/14 370/328 |
| 2013/0303214 | A1 * | 11/2013 | Ahmadi | H04W 72/1215 455/501 |
| 2014/0179316 | A1 * | 6/2014 | Hu | G06Q 10/06 455/435.1 |
| 2014/0227962 | A1 * | 8/2014 | Brisebois | H04W 48/04 455/1 |
| 2015/0023217 | A1 * | 1/2015 | Hu | H04W 88/06 370/259 |
| 2015/0023230 | A1 * | 1/2015 | Hu | H04W 72/1215 370/335 |
| 2015/0023258 | A1 * | 1/2015 | Hu | H04W 76/15 370/328 |
| 2015/0056915 | A1 * | 2/2015 | Brisebois | H04W 24/08 455/1 |
| 2015/0105075 | A1 * | 4/2015 | Yu | H04L 67/303 455/435.2 |
| 2015/0105080 | A1 * | 4/2015 | Jin | H04W 36/0038 455/436 |
| 2015/0156687 | A1 * | 6/2015 | Wu | H04W 48/18 455/436 |
| 2015/0163702 | A1 * | 6/2015 | Wu | H04W 48/08 370/331 |
| 2015/0215766 | A1 * | 7/2015 | Russell | H04W 8/18 455/433 |
| 2016/0080964 | A1 * | 3/2016 | Ahn | H04B 17/382 455/501 |
| 2016/0119223 | A1 * | 4/2016 | Ramachandran | H04L 45/507 370/219 |
| 2016/0219608 | A1 * | 7/2016 | Awoniyi-Oteri | H04W 72/1215 |
| 2016/0249228 | A1 * | 8/2016 | Zhao | H04W 48/08 |
| 2016/0295487 | A1 * | 10/2016 | Pandit | H04W 36/30 |
| 2016/0323733 | A1 | 11/2016 | Yu et al. | |
| 2016/0345377 | A1 * | 11/2016 | Lindoff | H04W 76/27 |
| 2016/0381629 | A1 * | 12/2016 | Yang | H04W 48/16 455/432.1 |
| 2017/0164212 | A1 * | 6/2017 | Opsenica | G06F 16/41 |
| 2018/0013594 | A1 * | 1/2018 | Mukkavilli | H04L 5/14 |
| 2018/0152832 | A1 | 5/2018 | Yu et al. | |
| 2018/0227745 | A1 * | 8/2018 | Russell | H04W 8/18 |
| 2018/0263042 | A1 * | 9/2018 | Montojo | H04W 72/56 |
| 2019/0021009 | A1 * | 1/2019 | Ku | H04W 48/04 |
| 2019/0053115 | A1 * | 2/2019 | Ngai | H04W 16/14 |
| 2019/0159115 | A1 * | 5/2019 | Russell | H04W 60/00 |
| 2020/0221464 | A1 * | 7/2020 | Nielsen | H04W 72/1268 |
| 2020/0322780 | A1 * | 10/2020 | Lauster | H04W 48/16 |
| 2020/0404479 | A1 * | 12/2020 | Lee | H04W 8/06 |
| 2021/0176622 | A1 * | 6/2021 | Lauster | H04W 48/14 |
| 2023/0021820 | A1 * | 1/2023 | Parichehrehteroujeni | H04W 74/002 |
| 2023/0254733 | A1 * | 8/2023 | Park | H04W 4/90 370/229 |
| 2024/0031852 | A1 * | 1/2024 | Jiang | H04W 24/10 |

FOREIGN PATENT DOCUMENTS

| | | | | |
|---|---|---|---|---|
| CN | 106068015 A | | 11/2016 | |
| CN | 106341794 A | | 1/2017 | |
| CN | 106658468 A | | 5/2017 | |
| CN | 108200570 A | | 6/2018 | |
| CN | 108605235 A | | 9/2018 | |
| CN | 112399526 A | * | 2/2021 | H04L 9/3271 |
| CN | 112399526 B | * | 3/2022 | H04L 9/3271 |
| EP | 2605561 A1 | | 6/2013 | |
| EP | 3357277 A1 | | 8/2018 | |
| EP | 3439350 A1 | | 2/2019 | |
| EP | 4181573 A1 | * | 5/2023 | H04W 28/0226 |
| WO | WO-2022014960 A1 | * | 1/2022 | H04W 28/0226 |

OTHER PUBLICATIONS

SA WG2, "Revised SID : Study on system enablers for multi-SIM devices", TSG SA Meeting #SP-83, SP-190179, Mar. 20-22, 2019, Shenzhen, China; SA WG2 Meeting #130, S2-1900688, Jan. 21-25, 2019, Kochi, India, (4p).

Ericsson, "Dual-SIM Dual-Standby UEs and their impact on the RAN", 3GPP TSG-RAN WG2 #75bis, Tdoc R2-115375, Zhuhai, China, Oct. 10-14, 2011, (3p).

Intel, et al., "Key issue on mechanism for suspension /resumption", SA WG2 Meeting #S2-135,S2-1910469, Oct. 14-18, 2019, Split Croatia, (revision of S2-1909940), (1p).

The First CNOA issued in Application No. 201980000738.9, dated Oct. 17, 2022, with English translation,(16p).

Han Ning, "Research of SINR Based multi-attribute Algorithm about Vertical Handoff in Heterogeneous Wireless Networks", release date 2013.2.15, publisher CNKI Information Technology, (66p).

Sandra Roger, et al., "Forced Inter-Operator Handover for V2X Communication in Multi-Operator Environments with Regional Splitting", 978-1-5386-4729-5/18/, 2018 IEEE,(5p).

International Search Report issued to PCT/CN2019/084315 dated Jan. 23, 2020 with English translation, (4p).

Notice of Allowance issued in CN Application No. 201980000738.9 dated May 18, 2023 with English translation, (6p).

\* cited by examiner

NETWORK SWITCHING RESOURCE DETERMINING METHOD AND NETWORK SWITCHING RESOURCE CONFIGURATION METHOD

CROSS-REFERENCE TO RELATED APPLICATION

The application is the national stage of International Application No. PCT/CN2019/084315, filed on Apr. 25, 2019, the disclosure of which is hereby incorporated by reference in its entirety for all purposes.

TECHNICAL FIELD

The present disclosure relates to the field of communication technology, in particular, to a network switching resource determining method, a network switching resource configuring method, a network switching resource determining apparatus, a network switching resource configuring apparatus, an electronic device, and a non-transitory computer-readable storage medium.

BACKGROUND

As for a multi-card mobile phone, for example, a dual-card mobile phone, in the case where the SIM (Subscriber Identity Module) card 1 is connected to the network of operator A, the SIM card 2 needs to carry out activities in the network of operator B sometimes, which will interrupt the activity in the network of operator A.

Since the network of operator A does not know that this is caused by the activity of the SIM card 2 in the mobile phone in the operator B network, it is generally determined that there is a problem on the communication connection with the mobile phone, and the power will be increased. It may even be determined that the wireless link fails and the wireless link recovery mechanism will be triggered.

However, even if the network of operator A increases the power, or even the wireless link recovery mechanism is triggered, since the mobile phone is carrying out activities in the network of operator B through the SIM card 2, during this period, it will not resume activities in the network of operator A, resulting that the network of operator A performs an invalid operation, wasting resources of the network of operator A.

SUMMARY

Embodiments of the present disclosure provides a method for determining a network switching resource, apparatus, and storage medium.

According to the first aspect of the present disclosure, there is provided a method for determining a network switching resource. The method may be applied to a terminal. The terminal may send, when establishing a connection to a first operator network in the at least two operator networks, pre-stored first information of a second operator network in the at least two operator networks and second information of the terminal in the second operator network to the first operator network. The terminal may be used to connect to the at least two operator networks.

The terminal may determine a time-domain resource for disconnecting from the first operator network and performing an activity in the second operator network according to first configuration information sent by the first operator network, and/or second configuration information sent by the second operator network after establishing a communication connection to the second operator network.

According to the second aspect of the present disclosure, there is provided a method for configuring a network switching resource. The method may be applied to a first operator network The first operator network may receive first information of a second operator network sent by a base station, and sending second information of a terminal in the second operator network to the first operator network. The first operator network may determine the second operator network according to the first information. The first operator network may negotiate with the second operator network according to the second information to determine and record a time-domain resource. The first operator network may generate first configuration information according to the time-domain resource. The first operator network may send the first configuration information to the terminal.

According to the third aspect of the present disclosure, there is provided a method for configuring a network switching resource. The method may be applied to a second operator network. The second operator network may negotiate with a first operator network according to second information of a terminal in the second operator network to determine a time-domain resource. The second operator network may generate second configuration information according to the time-domain resource. The second operator network may send the second configuration information to the terminal.

It is to be understood that the above general description and the following detailed description are examples and explanatory only and do not limit the present disclosure.

BRIEF DESCRIPTION OF THE DRAWINGS

In order to more clearly describe the technical solutions in the embodiments of the present disclosure, the drawings that need to be used in the description of the embodiments will be briefly introduced in the following. The drawings in the following description are only some of the present disclosure. Those skilled in the art may also obtain other drawings based on these drawings without creative labor.

DETAILED DESCRIPTION

The following will clearly and completely describe the technical solutions in the embodiments of the present disclosure in conjunction with the accompanying drawings in the embodiments of the present disclosure. The described embodiments are only a part of the embodiments of the present disclosure, not all of them. Based on the embodiments in the present disclosure, all other embodiments obtained by those of ordinary skill in the art without creative work all belong to the protection scope of the present disclosure.

Figure 1:
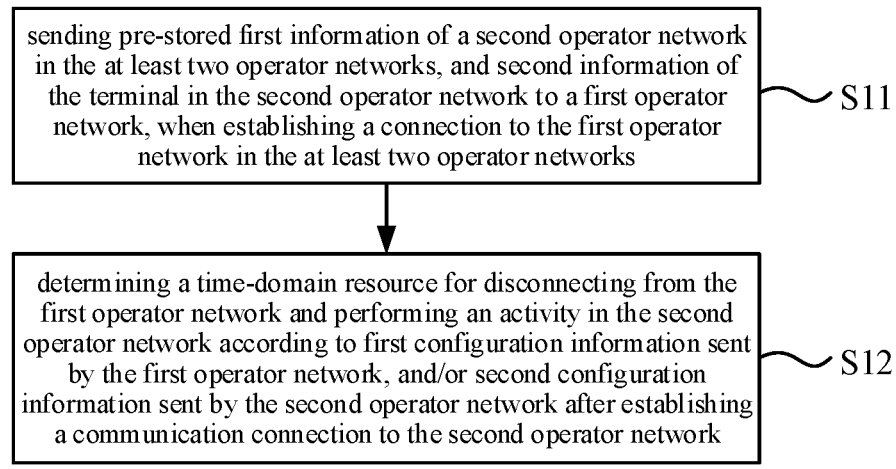
FIG. 1 is a schematic flowchart showing a network switching resource determining method according to an embodiment of the present disclosure.

FIG. 1 is a schematic flowchart showing a network switching resource determining method according to an embodiment of the present disclosure. The paging response method shown in the embodiment of the present disclosure may be applied to a terminal, and the terminal may communicate based on a multi-card single-standby (for example, dual-card single-standby) mode, or a multi-card multi-standby (for example, dual-card dual-standby) mode, or a multi-card multi-standby multi-pass (such as dual-card dual-standby dual-pass) mode.

The terminal is used to connect at least two operator networks. For example, the terminal can be used as a user device to communicate with a base station in the operator's network, where multiple SIM cards may be set in the terminal, and the SIM card may specifically be a USIM (Universal Subscriber Identity Module). The SIM card 1 of the multiple SIM cards can be connected to the network of the first operator, and SIM card 2 of the multiple SIM cards can be connected to the network of the second operator. The first operator network and the second operator network are networks provided by different operators. For example, the first operator network may be a network of Mobile, and the second operator network may be a network of Unicom or Telecom.

As shown in FIG. 1, the network switching resource determining method includes following steps.

In step S11, pre-stored first information of a second operator network in the at least two operator networks, and second information of the terminal in the second operator network to are sent to a first operator network, when a connection is established to the first operator network in the at least two operator networks.

In one embodiment, before establishing a connection to the first operator network, the terminal may first establish a connection with the second operator network, so as to obtain the first information of the second operator network, and the second information of the terminal in the second operator network.

The first information is information for the first operator network to determine the second operator network, for example, including but not limited to a PLMN (Public Land Mobile Network) identification of the second operator network. The second information is information for the first operator network and the second operator network to determine the terminal, for example, including but not limited to the IMSI (International Mobile Subscriber Identification Number) of the terminal in the second operator network.

After the first operator network receives the first information of the second operator network and the second information of the terminal in the second operator network, it can determine the second operator network according to the first information, and then negotiate with the second operator network. The terminal, i.e., the object of negotiation, can be determined with the second operator network according to the second information, and then the time-domain resource is determined and recorded by negotiating with the second operator network. The terminal disconnects from the first operator network and performs activities in the second operator network in the time-domain resource.

In an embodiment, after the first operator network determines the second operator network according to the first information, the process of negotiating with the second operator network can be performed as follows.

The first operator network first sends the negotiation signaling to the second operator network, and sends the second information (included in the negotiation signaling) of the terminal in the second operator network to the second operator network. After the second operator network receives the negotiation signaling, configuration information of the tracking area update (TAU) of the second operator network and/or the transmission period of different system information in the second operator network are sent to the first operator network. The first operator network determines the time-domain resource according to the tracking area update information and/or the transmission period.

Then, the first operator network may generate the first configuration information according to the determined time-domain resource, and then send the first configuration information to the terminal, such that the terminal can determine the time-domain resource.

In an embodiment, in addition to determining the time-domain resource according to the first configuration information sent by the first operator network, the terminal may also determine the time-domain resource according to the second configuration information sent by the second operator network after establishing a communication connection with the second operator network. In this case, the negotiation process between the first operator network and the second operator network can be performed as follows.

The first operator network first sends the negotiation signaling to the second operator network, and sends the second information (included in the negotiation signaling) of the terminal in the second operator network to the second operator network. After receiving the negotiation signaling, the second operator network calculates a paging period for paging the terminal according to the second information, and determines the paging period as the time-domain resource.

Then, the second operator network may generate second configuration information according to the determined time-domain resource, and then send the second configuration information to the terminal, such that the terminal can determine the time-domain resource.

In step S12, a time-domain resource for disconnecting from the first operator network and performing an activity in the second operator network is determined according to first configuration information sent by the first operator network, and/or second configuration information sent by the second operator network after establishing a communication connection to the second operator network.

The first operator network determines the second operator network according to the first information, and negotiates with the second operator network according to the second information to determine and record the time-domain resource. The first operator network generates the first configuration information according to the time-domain resource, and/or the second operator network generates the second configuration information according to the time-domain resource.

In one embodiment, since a time-domain resource in which the terminal disconnects from the first operator network and performs an activity in the second operator network is determined according to first configuration information sent by the first operator network and/or second configuration information sent by the second operator network, and the first configuration information and the second configuration information are both negotiated and determined by the first operator network and the second operator network for the terminal, therefore, the first operator network can know the time-domain resource, that is, know when the terminal disconnects from the first operator network and performs activities in the second operator network.

Then, when the terminal disconnects from the first operator network and performs activities in the second operator network in the time-domain resource, the first operator network will not erroneously consider that a problem occurs in the communication connection to the terminal, and it will not increase the power, even trigger the misoperation of the wireless link recovery mechanism, thereby effectively avoiding waste of network resources of the first operator.

Figure 2:
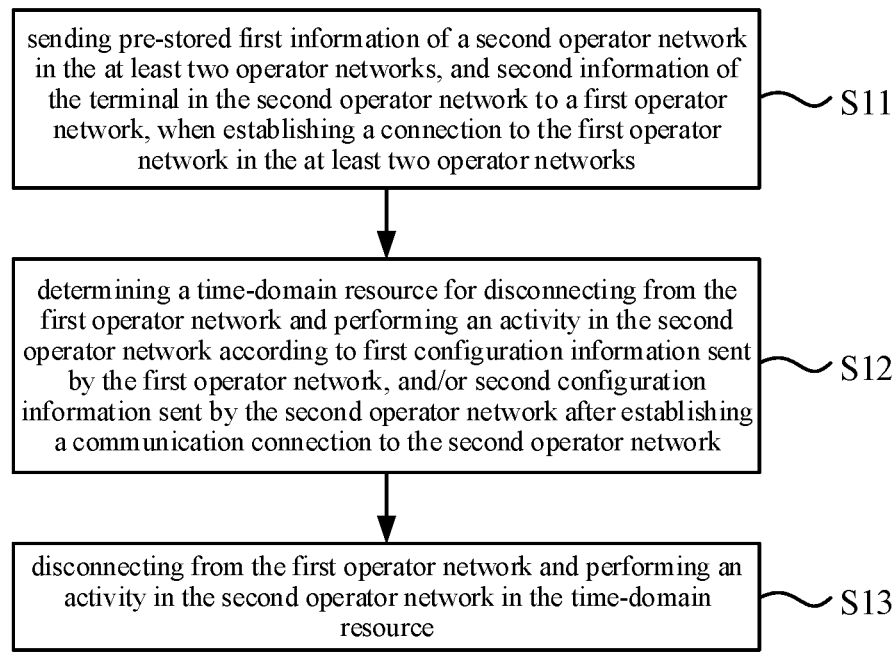
FIG. 2 is a schematic flowchart showing a network switching resource determining method according to another embodiment of the present disclosure.

FIG. 2 is a schematic flowchart showing a network switching resource determining method according to another embodiment of the present disclosure. As shown in FIG. 2, the method further includes:

step S13, disconnecting from the first operator network and performing an activity in the second operator network in the time-domain resource.

In an embodiment, after determining the time-domain resource, the first terminal may determine whether it needs to disconnect from the first operator network and perform activities in the second operator network in the time-domain resource according to the actual situation of the time-domain resource. If it does, in the time-domain resource, the connection to the first operator network can be disconnected and activities may be performed in the second operator network.

The actual situation includes, but not limited to: the priority of the communication between the first terminal and the first operator network, whether the SIM card 2 is still in the terminal, and the power of the terminal.

For example, in the time-domain resource, the priority of the communication between the first terminal and the first operator network is the highest level, then it can be determined that it does not need to disconnect from the first operator network and perform activities in the second operator network in the time-domain resource, to ensure that communication of the highest level can continue. The priority of the communication between the first terminal and the first operator network may be determined based on the service type of the communication between the first terminal and the first operator network, Quality of Service (QoS), and QoS Class Identifier (QCI). For example, if the QCI is 1, the priority is the highest.

For example, if the SIM card 2 is not in the terminal, it can also be determined that it does not need to disconnect from the first operator network and perform activities in the second operator network in the time-domain resource, to avoid invalid operations, wasting terminal resources.

For example, if the power of the terminal is lower than the preset power, it can also be determined that it does not need to disconnect from the first operator network and perform activities in the second operator network in the time-domain resource, to avoid consume power of the terminal excessively.

Figure 3:
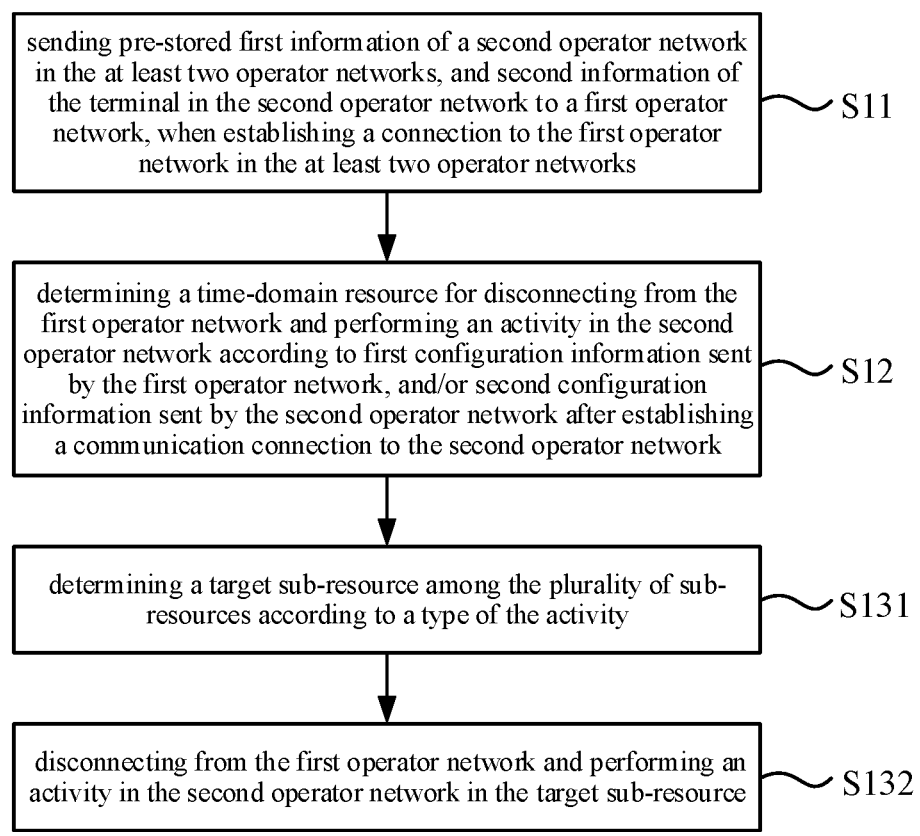
FIG. 3 is a schematic flowchart showing a network switching resource determining method according to yet another embodiment of the present disclosure.

FIG. 3 is a schematic flowchart showing a network switching resource determining method according to yet another embodiment of the present disclosure. As shown in FIG. 3, the time-domain resource includes a plurality of sub-resources, and disconnecting from the first operator network and performing an activity in the second operator network in the time-domain resource includes:

step S131, determining a target sub-resource among the plurality of sub-resources according to a type of the activity;

step S132, disconnecting from the first operator network and performing an activity in the second operator network in the target sub-resource.

In an embodiment, the first operator network and/or the second operator network can allocate sub-resources respectively based on the type of the activity that is performed in the second operator network when the terminal disconnects from the first operator network.

For example, the first operator network can determine the target sub-resource according to the configuration information of the tracking area update sent by the second operator network, and then allocate the target sub-resource to the terminal through the first configuration information. When the terminal determines that the type of the activity is performing tracking area update in the second operator network, it can disconnect from the first operator network and perform activities in the second operator network in the target sub-resource.

For example, the first operator network may determine the second target sub-resource according to the transmission period of different system information sent by the second operator network, and then allocate the target sub-resource to the terminal through the first configuration information. When the terminal determines that the type of the activity is receiving a system message sent by the second operator network, it can disconnect from the first operator network and perform activities in the second operator network in the target sub-resource.

Accordingly, it may more flexibly and accurately instruct the time-domain resource in which the terminal disconnects from the first operator network and performs activities in the second operator network.

In some embodiments, the type of the activity includes at least one of:

monitoring a paging message sent by the second operator network, responding to the paging message sent by the second operator network, measuring communication information of the second operator network, receiving a system message sent by the second operator network, and performing tracking area update in the second operator network.

It should be noted that the type of the activity is not limited to the above, and it can be specifically set as needed, as long as activities that need to be performed in the second operator network when the terminal disconnects from the first operator network all belong to the type of activities in this embodiment.

Figure 4:
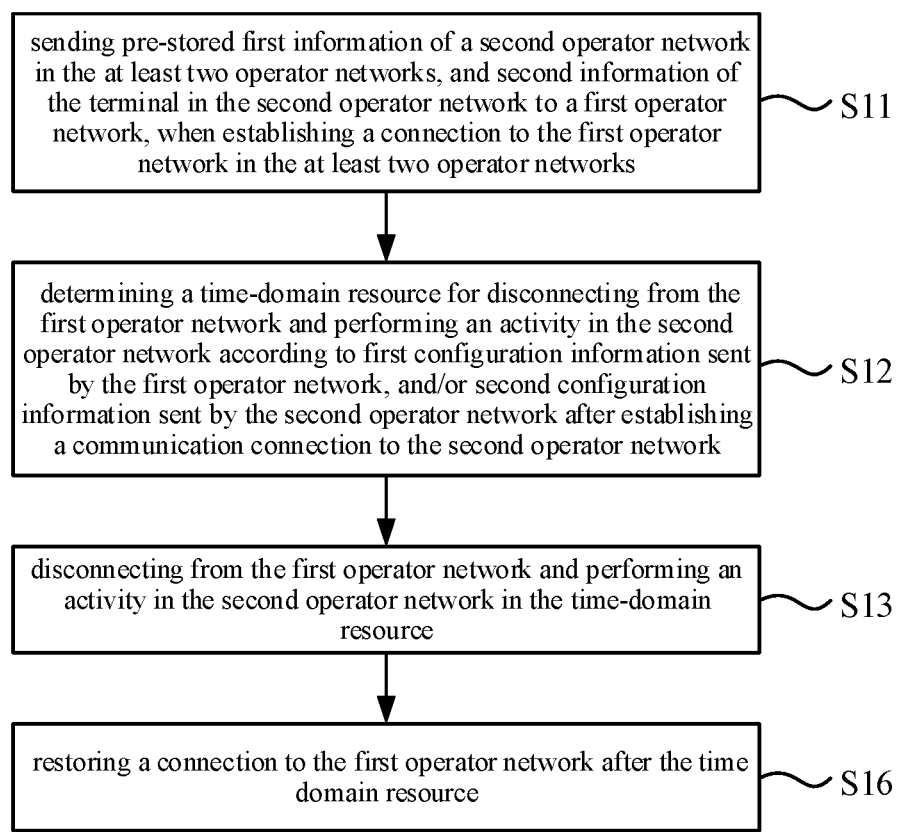
FIG. 4 is a schematic flowchart showing a network switching resource determining method according to yet another embodiment of the present disclosure.

FIG. 4 is a schematic flowchart showing a network switching resource determining method according to yet another embodiment of the present disclosure. As shown in FIG. 4, the method further includes:

step S14, restoring a connection to the first operator network after the time-domain resource.

In one embodiment, the terminal may disconnect from the first operator network and perform activities only in the time-domain resource, and restore the connection to the first operator network after the time-domain resource. Therefore, without the first operator network sending paging signaling to the terminal, the terminal can be reconnected to the first operator network, which reduces occupation of the network resource of the first operator.

In one embodiment, if the terminal determines that it needs to connect to the second operator network after the time-domain resource, it can send notification information to the first operator network, to notify the first operator network that the connection with the first operator network is not automatically restored after the time-domain resource. In this case, if the first operator network needs to communicate with the terminal, it can send a paging message to the terminal.

Figure 5:
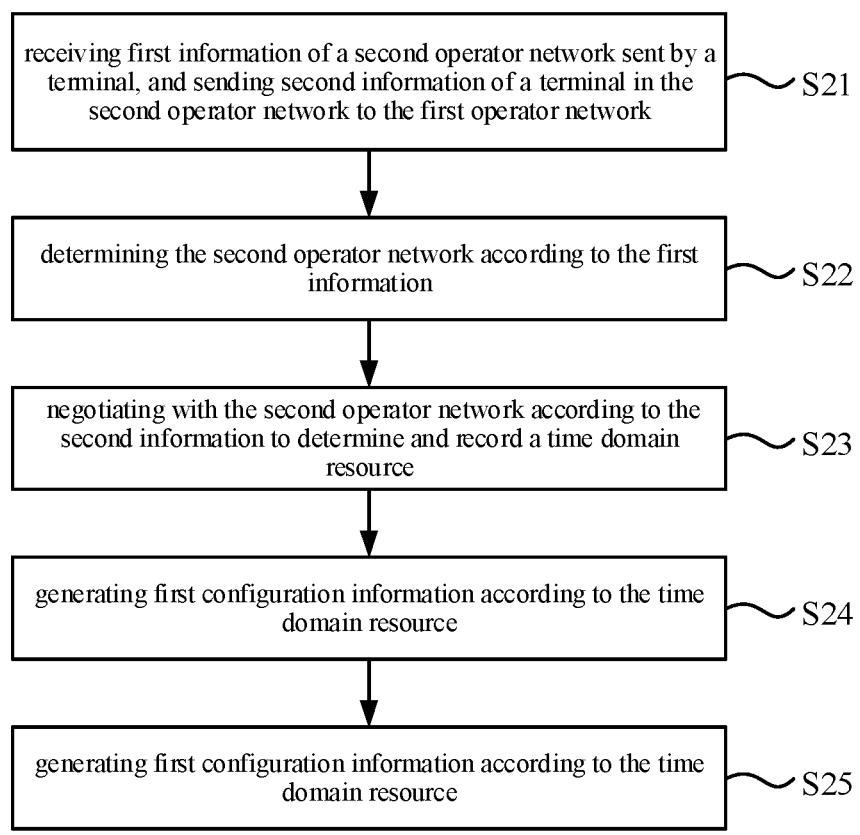
FIG. 5 is a schematic flowchart showing a network switching resource configuring method according to an embodiment of the present disclosure.

FIG. 5 is a schematic flowchart showing a network switching resource configuring method according to an embodiment of the present disclosure. The network switching resource configuration method shown in the embodiment of the present disclosure may be applicable to a first operator network, such as the first operator network in the above-mentioned embodiment. The first operator network may establish a communication connection with a terminal, for example, it may establish a connection with the SIM card 1 of the multiple SIM cards in the terminal.

As shown in FIG. 5, the network switching resource configuring method may include the following steps:

step S21, receiving first information of a second operator network sent by a terminal, and sending second information of a terminal in the second operator network to the first operator network, wherein the terminal is used to connect to at least two operator networks, the at least two operator networks including the first operator network and the second operator network;

step S22, determining the second operator network according to the first information;

step S23, negotiating with the second operator network according to the second information to determine and record a time-domain resource, wherein the terminal disconnects from the first operator network and performs activities in the second operator network in the time-domain resource;

step S24, generating first configuration information according to the time-domain resource; and step S25, sending the first configuration information to the terminal.

In an embodiment, after the first operator network receives the first information of the second operator network and the second information of the terminal in the second operator network, it can determine the second operator network according to the first information, and then negotiate with the second operator network. The terminal, i.e., the object of negotiation, can be determined with the second operator network according to the second information, and then the time-domain resource is determined and recorded by negotiating with the second operator network. The terminal disconnects from the first operator network and performs activities in the second operator network in the time-domain resource.

In an embodiment, after the first operator network determines the second operator network according to the first information, the process of negotiating with the second operator network can be performed as follows.

The first operator network first sends the negotiation signaling to the second operator network, and sends the second information (included in the negotiation signaling) of the terminal in the second operator network to the second operator network. After the second operator network receives the negotiation signaling, configuration information of the tracking area update of the second operator network and/or the transmission period of different system information in the second operator network are sent to the first operator network. The first operator network determines the time-domain resource according to the tracking area update information and/or the transmission period.

Then, the first operator network may generate the first configuration information according to the determined time-domain resource, and then send the first configuration information to the terminal, such that the terminal can determine the time-domain resource.

In an embodiment, since a time-domain resource in which the terminal disconnects from the first operator network and performs an activity in the second operator network is determined according to first configuration information sent by the first operator network, and the first configuration information is negotiated and determined by the first operator network and the second operator network for the terminal, therefore, the first operator network can know the time-domain resource, that is, know when the terminal disconnects from the first operator network and performs activities in the second operator network.

Then, when the terminal disconnects from the first operator network and performs activities in the second operator network in the time-domain resource, the first operator network will not erroneously consider that a problem occurs in the communication connection to the terminal, and it will not increase the power, even trigger the misoperation of the wireless link recovery mechanism, thereby effectively avoiding waste of network resources of the first operator.

Figure 6:
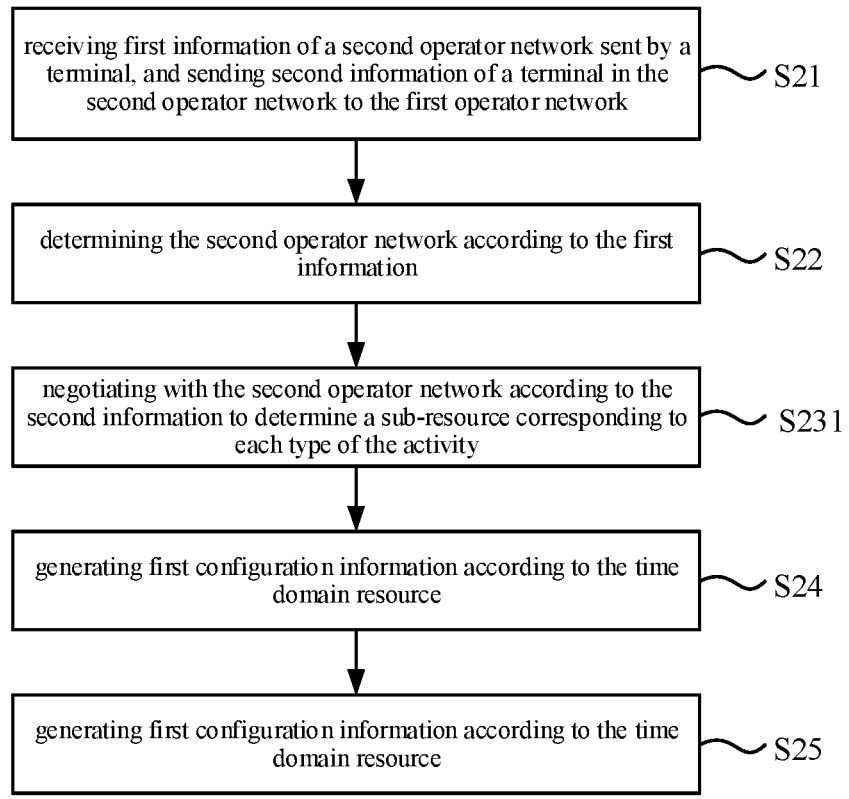
FIG. 6 is a schematic flowchart showing a network switching resource configuring method according to another embodiment of the present disclosure.

FIG. 6 is a schematic flowchart showing a network switching resource configuring method according to another embodiment of the present disclosure. As shown in FIG. 6, the time-domain resource includes a plurality of sub-resources, and negotiating with the second operator network according to the second information to determine and record a time-domain resource includes:

step S231, negotiating with the second operator network according to the second information to determine a sub-resource corresponding to each type of the activity.

In an embodiment, the first operator network can allocate sub-resources respectively based on the type of the activity that is performed in the second operator network when the terminal disconnects from the first operator network.

For example, the first operator network can determine the first target sub-resource according to the configuration information of the tracking area update sent by the second operator network, and then allocate the first target sub-resource to the terminal through the first configuration information. When the terminal determines that the type of the activity is performing tracking area update in the second operator network, it can disconnect from the first operator network and perform activities in the second operator network in the first target sub-resource.

For example, the first operator network may determine the second target sub-resource according to the transmission period of different system information sent by the second operator network, and then allocate the second target sub-resource to the terminal through the first configuration information. When the terminal determines that the type of the activity is receiving a system message sent by the second operator network, it can disconnect from the first operator network and perform activities in the second operator network in the second target sub-resource.

Accordingly, it may more flexibly and accurately instruct the time-domain resource in which the terminal disconnects from the first operator network and performs activities in the second operator network.

In some embodiments, the type of the activity includes at least one of:

monitoring a paging message sent by the second operator network, responding to the paging message sent by the second operator network, measuring communication information of the second operator network, receiving a system message sent by the second operator network, and performing tracking area update in the second operator network.

It should be noted that the type of the activity is not limited to the above, and it can be specifically set as needed, as long as activities that need to be performed in the second operator network when the terminal disconnects from the first operator network all belong to the type of activities in this embodiment.

Figure 7:
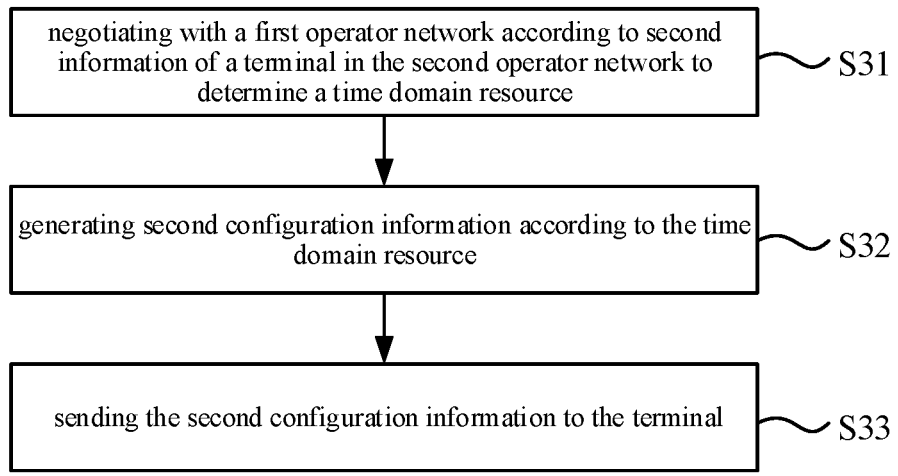
FIG. 7 is a schematic flowchart showing a network switching resource configuring method according to an embodiment of the present disclosure.

FIG. 7 is a schematic flowchart showing a network switching resource configuring method according to an embodiment of the present disclosure. The network switching resource configuration method shown in the embodiment of the present disclosure may be applicable to a second operator network, such as the second operator network in the above-mentioned embodiment. The second operator network may establish a communication connection with a terminal, for example, it may establish a connection with the SIM card 2 of the multiple SIM cards in the terminal.

As shown in FIG. 7, the network switching resource configuring method may include the following steps:

step S31, negotiating with a first operator network according to second information of a terminal in the second operator network to determine a time-domain resource, wherein the terminal disconnects from the first operator network and performs activities in the second operator network in the time-domain resource, the terminal is used to connect to at least two operator networks, the at least two operator networks including the first operator network and the second operator network;

step S32, generating second configuration information according to the time-domain resource; and step S33, sending the second configuration information to the terminal.

In an embodiment, negotiating with a first operator network according to second information of a terminal in the second operator network to determine a time-domain resource may be performed in the following manner.

The first operator network first sends the negotiation signaling to the second operator network, and sends the second information (included in the negotiation signaling) of the terminal in the second operator network to the second operator network. After receiving the negotiation signaling, the second operator network calculates a paging period for paging the terminal according to the second information, and determines the paging period as the time-domain resource.

Then, the second operator network may generate second configuration information according to the determined time-domain resource, and then send the second configuration information to the terminal, such that the terminal can determine the time-domain resource.

In an embodiment, since a time-domain resource in which the terminal disconnects from the first operator network and performs an activity in the second operator network is determined according to second configuration information sent by the second operator network, and the second configuration information is negotiated and determined by the first operator network and the second operator network for the terminal, therefore, the first operator network can know the time-domain resource, that is, know when the terminal disconnects from the first operator network and performs activities in the second operator network.

Then, when the terminal disconnects from the first operator network and performs activities in the second operator network in the time-domain resource, the first operator network will not erroneously consider that a problem occurs in the communication connection to the terminal, and it will not increase the power, even trigger the misoperation of the wireless link recovery mechanism, thereby effectively avoiding waste of network resources of the first operator.

Figure 8:
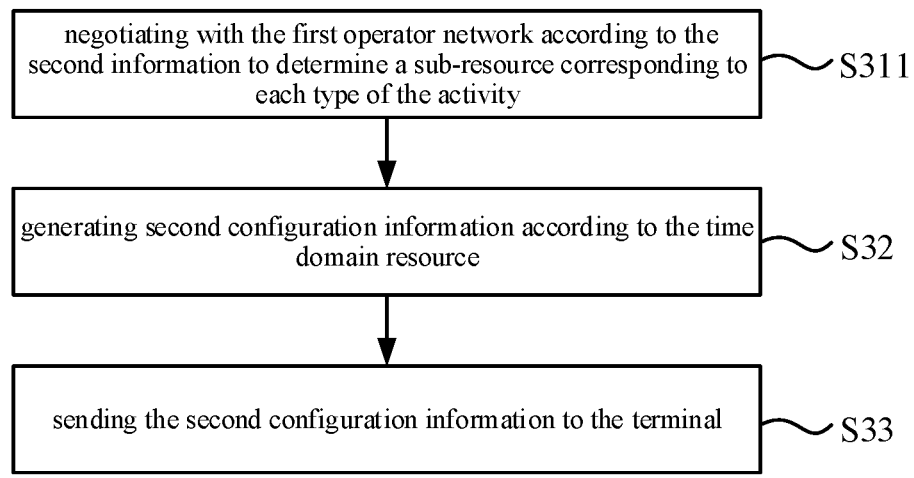
FIG. 8 is a schematic flowchart showing a network switching resource configuring method according to another embodiment of the present disclosure.

FIG. 8 is a schematic flowchart showing a network switching resource configuring method according to another embodiment of the present disclosure. As shown in FIG. 8, negotiating with a first operator network according to second information of a terminal in the second operator network to determine a time-domain resource includes:

step S311, negotiating with the first operator network according to the second information to determine a sub-resource corresponding to each type of the activity.

In one embodiment, the second operator network can allocate sub-resources respectively based on the type of the activity that is performed in the second operator network when the terminal disconnects from the first operator network.

For example, the second operator network may calculate the paging period for paging the terminal based on the second information, and determine the paging period as the third target sub-resource, and then allocate the third target sub-resource to the terminal through the second configuration information. When the terminal determines that the type of the activity is monitoring paging messages in the second operator network, it can disconnect from the first operator network and perform activities in the second operator network in the third target sub-resource.

For example, the second operator network may determine the fourth target sub-resource according to the transmission period of different system information, and then allocate the fourth target sub-resource to the terminal through the second configuration information. When the terminal determines that the type of the activity is receiving a system message sent by the second operator network, it can disconnect from the first operator network and perform activities in the second operator network in the fourth target sub-resource.

Accordingly, it may more flexibly and accurately instruct the time-domain resource in which the terminal disconnects from the first operator network and performs activities in the second operator network.

In some embodiments, the type of the activity includes at least one of:

monitoring a paging message sent by the second operator network, responding to the paging message sent by the second operator network, measuring communication information of the second operator network, receiving a system message sent by the second operator network, and performing tracking area update in the second operator network.

It should be noted that the type of the activity is not limited to the above, and it can be specifically set as needed, as long as activities that need to be performed in the second operator network when the terminal disconnects from the first operator network all belong to the type of activities in this embodiment.

Corresponding to the foregoing embodiments of the network switching resource determining method and the network switching resource configuring method, the present disclosure also provides embodiments of a network switching resource determining apparatus and a network switching resource configuring apparatus.

Figure 9:
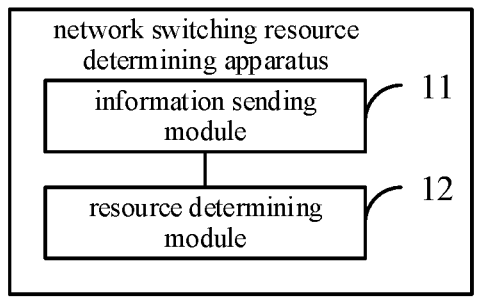
FIG. 9 is a schematic block diagram showing a network switching resource determining apparatus according to an embodiment of the present disclosure.

FIG. 9 is a schematic block diagram showing a network switching resource determining apparatus according to an embodiment of the present disclosure. The paging response apparatus shown in the embodiment of the present disclosure may be applied to a terminal, and the terminal may communicate based on a multi-card single-standby (for example, dual-card single-standby) mode, or a multi-card multi-standby (for example, dual-card dual-standby) mode, or a multi-card multi-standby multi-pass (such as dual-card dual-standby dual-pass) mode.

The terminal is used to connect at least two operator networks. For example, the terminal can be used as a user device to communicate with a base station in the operator's network, where multiple SIM cards may be set in the terminal, and the SIM card may specifically be a USIM. The SIM card 1 of the multiple SIM cards can be connected to the network of the first operator, and SIM card 2 of the multiple SIM cards can be connected to the network of the second operator. The first operator network and the second operator network are networks provided by different operators. For example, the first operator network may be a network of Mobile, and the second operator network may be a network of Unicom or Telecom.

As shown in FIG. 9, the network switching resource determining apparatus includes:

an information sending module 11, configured to send pre-stored first information of a second operator network in the at least two operator networks, and second information of the terminal in the second operator network to a first operator network, when the terminal establishes a connection to the first operator network in the at least two operator networks; and a resource determining module 12, configured to determine a time-domain resource for disconnecting from the first operator network and performing an activity in the second operator network according to first configuration information sent by the first operator network, and/or second configuration information sent by the second operator network after the terminal establishes a communication connection to the second operator network, wherein, the first operator network determines the second operator network according to the first information, and negotiates with the second operator network according to the second information to determine and record the time-domain resource. The first operator network generates the first configuration information according to the time-domain resource, and/or the second operator network generates the second configuration information according to the time-domain resource.

Figure 10:
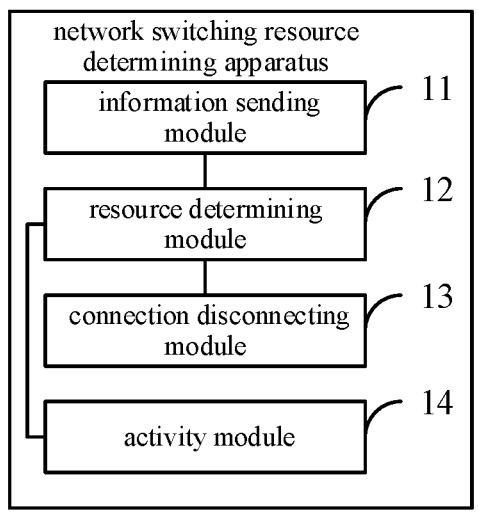
FIG. 10 is a schematic block diagram showing a network switching resource determining apparatus according to another embodiment of the present disclosure.

FIG. 10 is a schematic block diagram showing a network switching resource determining apparatus according to another embodiment of the present disclosure. As shown in FIG. 10, the apparatus further includes:

a connection disconnecting module 13, configured to disconnect from the first operator network in the time-domain resource;

an activity module 14, configured to perform an activity in the second operator network in the time-domain resource.

Figure 11:
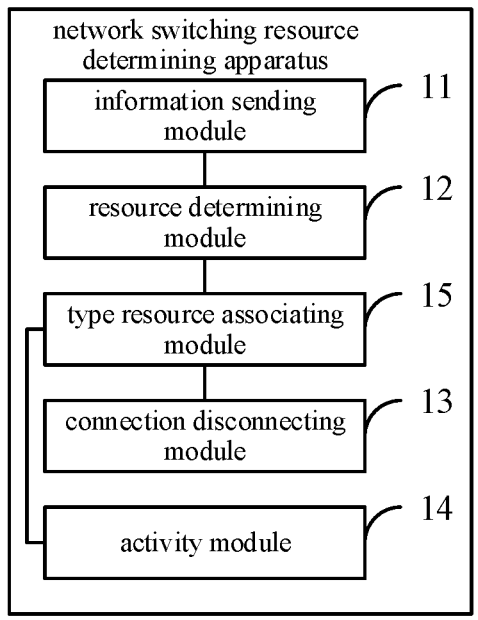
FIG. 11 is a schematic block diagram showing a network switching resource determining apparatus according to yet another embodiment of the present disclosure.

FIG. 11 is a schematic block diagram showing a network switching resource determining apparatus according to yet another embodiment of the present disclosure. As shown in FIG. 11, the time-domain resource includes a plurality of sub-resources, and the apparatus further includes:

a type resource associating module 15, configured to determine a target sub-resource among the plurality of sub-resources according to a type of the activity, wherein, the connection disconnecting module 13 is configured to disconnect from the first operator network in the target sub-resource, and the activity module 14 is configured to perform an activity in the second operator network.

In some embodiments, the type of the activity includes at least one of:

monitoring a paging message sent by the second operator network, responding to the paging message sent by the second operator network, measuring communication information of the second operator network, receiving a system message sent by the second operator network, and performing tracking area update in the second operator network.

Figure 12:
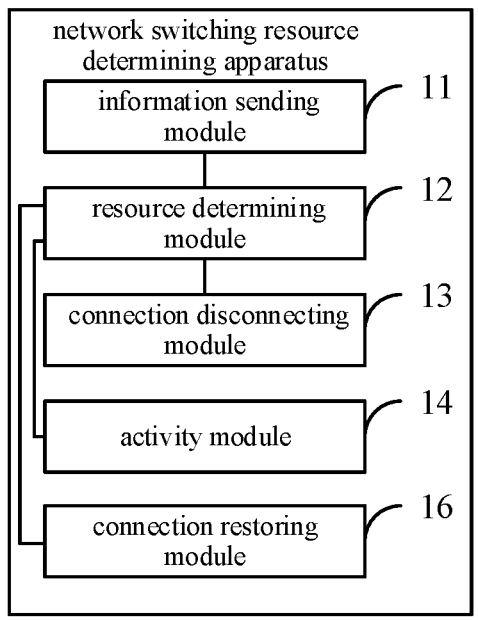
FIG. 12 is a schematic block diagram showing a network switching resource determining apparatus according to yet another embodiment of the present disclosure.

FIG. 12 is a schematic block diagram showing a network switching resource determining apparatus according to yet another embodiment of the present disclosure. As shown in FIG. 12, the apparatus further includes:

a connection restoring module 16, configured to restore a connection to the first operator network after the time-domain resource.

Figure 13:
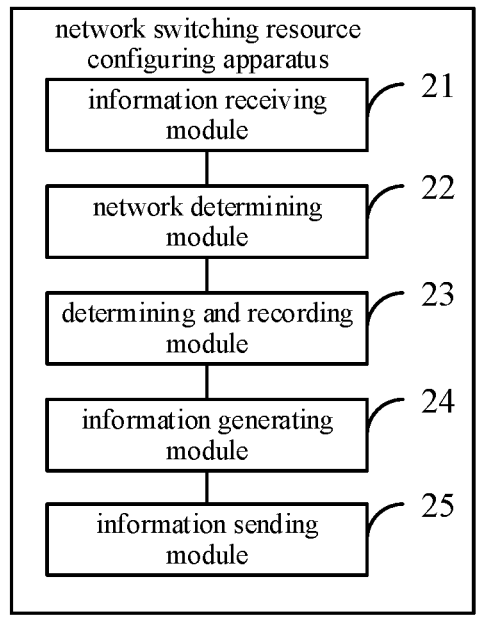
FIG. 13 is a schematic block diagram showing a network switching resource configuring apparatus according to an embodiment of the present disclosure.

FIG. 13 is a schematic block diagram showing a network switching resource configuring apparatus according to an embodiment of the present disclosure. The network switching resource configuration apparatus shown in the embodiment of the present disclosure may be applicable to a first operator network, such as the first operator network in the above-mentioned embodiment. The first operator network may establish a communication connection with a terminal, for example, it may establish a connection with the SIM card 1 of the multiple SIM cards in the terminal.

As shown in FIG. 13, the network switching resource configuring apparatus may include:

an information receiving module 21, configured to receive first information of a second operator network sent by a base station, and send second information of a terminal in the second operator network to the first operator network, wherein the terminal is used to connect to at least two operator networks, the at least two operator networks including the first operator network and the second operator network;

a network determining module 22, configured to determine the second operator network according to the first information;

a determining and recording module 23, configured to negotiate with the second operator network according to the second information to determine and record a time-domain resource, wherein the terminal disconnects from the first operator network and performs activities in the second operator network in the time-domain resource;

an information generating module 24, configured to generate first configuration information according to the time-domain resource; and an information sending module 25, configured to send the first configuration information to the terminal.

In some embodiments, the determining and recording module is configured to negotiate with the second operator network according to the second information to determine a sub-resource corresponding to each type of the activity.

In some embodiments, the type of the activity includes at least one of:

monitoring a paging message sent by the second operator network, responding to the paging message sent by the second operator network, measuring communication information of the second operator network, receiving a system message sent by the second operator network, and performing tracking area update in the second operator network.

Figure 14:
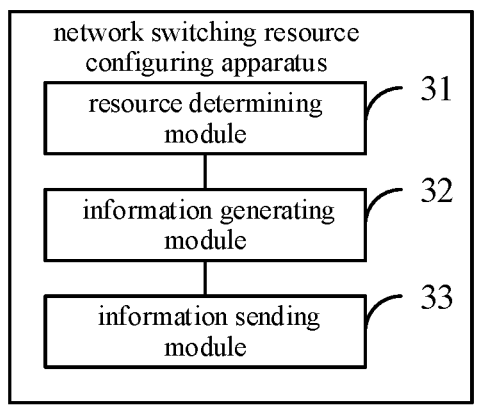
FIG. 14 is a schematic block diagram showing a network switching resource configuring apparatus according to an embodiment of the present disclosure.

FIG. 14 is a schematic block diagram showing a network switching resource configuring apparatus according to an embodiment of the present disclosure. The network switching resource configuration apparatus shown in the embodiment of the present disclosure may be applicable to a second operator network, such as the second operator network in the above-mentioned embodiment. The second operator network may establish a communication connection with a terminal, for example, it may establish a connection with the SIM card 2 of the multiple SIM cards in the terminal.

As shown in FIG. 14, the network switching resource configuring apparatus may include:

a resource determining module 31, configured to negotiate with a first operator network according to second information of a terminal in the second operator network to determine a time-domain resource, wherein the terminal disconnects from the first operator network and performs activities in the second operator network in the time-domain resource, the terminal is used to connect to at least two operator networks, the at least two operator networks including the first operator network and the second operator network;

an information generating module 32, configured to generate second configuration information according to the time-domain resource; and an information sending module 33, configured to send the second configuration information to the terminal.

In some embodiments, the resource determining module is configured to negotiate with the first operator network according to the second information to determine a sub-resource corresponding to each type of the activity.

In some embodiments, the type of the activity includes at least one of:

monitoring a paging message sent by the second operator network, responding to the paging message sent by the second operator network, measuring communication information of the second operator network, receiving a system message sent by the second operator network, and performing tracking area update in the second operator network.

Regarding the apparatus in the foregoing embodiment, the specific manner in which each module performs operations has been described in detail in the embodiment of the related method, and will not be elaborated herein.

For the apparatus embodiment, since it basically corresponds to the method embodiment, the relevant part can refer to the part of the description of the method embodiment. The apparatus embodiments described above are merely illustrative, and the modules described as separate components may or may not be physically separated, and the components displayed as modules may or may not be physical modules, that is, they may be located in one place, or they can be distributed to multiple network modules. Some or all of the modules can be selected according to actual needs to achieve the objectives of the solutions of the embodiments. Those of ordinary skill in the art can understand and implement it without creative work.

An embodiment of the present disclosure further provides an electronic device, including:

a processor; and a memory for storing instructions executable by the processor, wherein, the processor is configured to implement the network switching resource determining method according to any one of the above embodiments.

An embodiment of the present disclosure further provides an electronic device, including:

a processor; and a memory for storing instructions executable by the processor, wherein, the processor is configured to implement the network switching resource configuring method applicable to the first operator network according to any one of the above embodiments.

An embodiment of the present disclosure further provides an electronic device, including:

a processor; and a memory for storing instructions executable by the processor, wherein, the processor is configured to implement the network switching resource configuring method applicable to the second operator network according to any one of the above embodiments.

An embodiment of the present disclosure further provides a computer-readable storage medium having a computer program stored thereon, wherein the program implements steps in the network switching resource determining method according to any one of the above embodiments when executed by a processor.

An embodiment of the present disclosure further provides a computer-readable storage medium having a computer program stored thereon, wherein the program implements steps in the network switching resource configuring method applicable to the first operator network according to any one of the above embodiments when executed by a processor.

An embodiment of the present disclosure further provides a computer-readable storage medium having a computer program stored thereon, wherein the program implements steps in the network switching resource configuring method applicable to the second operator network according to any one of the above embodiments when executed by a processor.

Figure 15:
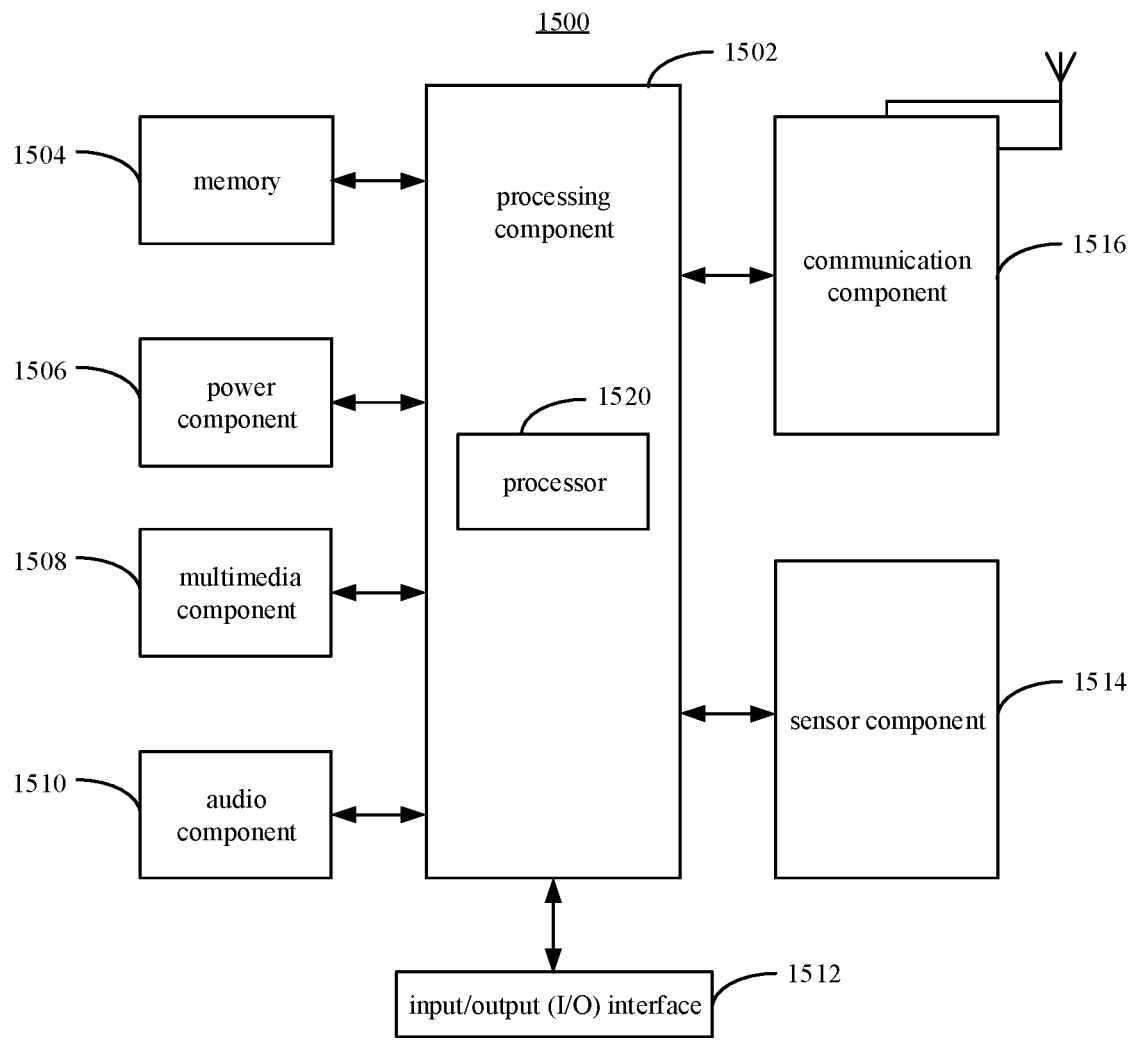
FIG. 15 is a schematic block diagram showing a network switching resource determining apparatus according to an embodiment of the present disclosure.

FIG. 15 is a schematic block diagram showing a network switching resource determining apparatus 1500 according to an embodiment of the present disclosure. For example, the apparatus 1500 may be a mobile phone, a computer, a digital broadcasting terminal, a messaging device, a game console, a tablet device, a medical device, a fitness device, a personal digital assistant, and the like.

Referring to FIG. 15, the apparatus 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls overall operations of the apparatus 1500, such as the operations associated with display, phone call, data communications, camera operations, and recording operations. The processing component 1502 may include one or more processors 820 to execute instructions, to perform all or part of the steps of the network switching resource determining method. Moreover, the processing component 1502 may include one or more modules which facilitate the interaction between the processing component 1502 and other components. For instance, the processing component 1502 may include a multimedia module to facilitate the interaction between the multimedia component 1508 and the processing component 1502.

The memory 1504 is configured to store various types of data to support the operation of the apparatus 1500. Examples of such data include instructions for any applications or methods operated on the apparatus 1500, contact data, telephone directory data, messages, pictures, video, or the like. The memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the apparatus 1500. The power component 1506 may include a power management system, one or more power sources, and any other components associated with the generation, management, and distribution of power in the apparatus 1500.

The multimedia component 1508 includes a screen providing an output interface between the apparatus 1500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1508 includes a front camera and/or a rear camera. When the apparatus 1500 is in an operation mode, such as a shooting mode or a video mode, the front camera and/or the rear camera can receive external multimedia data. Each front and rear camera can be a fixed optical lens system or have focal length and optical zoom capability.

The audio component 1510 is configured to output and/or input audio signals. For example, the audio component 1510 includes a microphone ("MIC") configured to receive an external audio signal when the apparatus 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1512 provides an interface between the processing component 1502 and peripheral interface modules, such as a keyboard, a click wheel, buttons, and the like. These buttons may include, but are not limited to, a home button, a volume button, a start button, and a lock button.

The sensor component 1514 includes one or more sensors to provide status assessments of various aspects of the apparatus 1500. For instance, the sensor component 1514 may detect an on/off status of the apparatus 1500, relative positioning of components, e.g., the display and the keypad, of the apparatus 1500, a change in position of the apparatus 1500 or a component of the apparatus 1500, a presence or absence of user contact with the apparatus 1500, an orientation or an acceleration/deceleration of the apparatus 1500, and a change in temperature of the apparatus 1500. The sensor component 1514 may include a proximity sensor configured to detect the presence of nearby objects without any physical contact. The sensor component 1514 may also include a light sensor, such as a CMOS or CCD image sensor, for use in imaging applications. In some embodiments, the sensor component 1514 may also include an accelerometer sensor, a gyroscope sensor, a magnetic sensor, a pressure sensor, or a temperature sensor.

The communication component 1516 is configured to facilitate wired or wireless communication between the apparatus 1500 and other devices. The communication component 1516 can access a wireless network based on a communication standard, such as WiFi, 2G or 3G, 4G LTE, 5G NR, or a combination thereof. In an embodiment, the communication component 1516 receives a broadcast signal or broadcast related information from an external broadcast management system via a broadcast channel. In an embodiment, the communication component 1516 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In embodiments, the apparatus 1500 may be implemented with one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, to perform the above network switching resource determining method.

In embodiments, there is also provided a non-transitory computer-readable storage medium including instructions, such as included in the memory 1504, executable by the processor 1520 of the apparatus 1500, for performing the network switching resource determining method. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art after consideration of the specification and practice of the disclosure disclosed here. This application is intended to cover any variations, uses, or adaptations of the disclosure following the general principles thereof and including known knowledge or conventional technical means in the art not disclosed in the present disclosure. It is intended that the specification and embodiments are considered as exemplary only, with a true scope and spirit of the disclosure being indicated by the following claims.

According to embodiments of the present disclosure, since a time-domain resource in which the terminal disconnects from the first operator network and performs an activity in the second operator network is determined according to first configuration information sent by the first operator network and/or second configuration information sent by the second operator network, and the first configuration information and the second configuration information are both negotiated and determined by the first operator network and the second operator network for the terminal, therefore, the first operator network can know the time-domain resource, that is, know when the terminal disconnects from the first operator network and performs activities in the second operator network.

Then, when the terminal disconnects from the first operator network and performs activities in the second operator network in the time-domain resource, the first operator network will not erroneously consider that a problem occurs in the communication connection to the terminal, and it will not increase the power, even trigger the misoperation of the wireless link recovery mechanism, thereby effectively avoiding waste of network resources of the first operator.

It will be appreciated that the present disclosure is not limited to the exact construction that has been described above and illustrated in the accompanying drawings, and that various modifications and changes may be made without departing from the scope thereof. The scope of the disclosure is only limited by the appended claims.

It should be noted that in this article, relational terms such as first and second are only used to distinguish one entity or operation from another entity or operation, and do not necessarily require or imply there is any such actual relationship or sequence between these entities or operations. The terms "including", "including", or any other variants thereof are intended to cover non-exclusive inclusion, so that a process, method, article or device that includes a series of elements includes not only those elements, but also other elements that are not explicitly listed, or also include elements inherent to such processes, methods, articles, or devices. If there are no more restrictions, the element defined by the sentence "including a . . . " does not exclude the existence of other identical elements in the process, method, article, or device that includes the element.

The methods and apparatuses provided in the embodiments of the present disclosure are described in detail above. Specific examples are used in this article to illustrate the principles and implementations of the present disclosure. The descriptions of the above embodiments are only used to help understand the method and core ideas of the present disclosure; meanwhile, for those skilled in the art, according to the ideas of the present disclosure, there will be changes in the specific implementation and the scope of application. In summary, the content of this specification should not be construed as limitation to the present disclosure.

What is claimed is:

1. A method for determining a network switching resource, applied to a terminal, and comprising:
   sending, when establishing a connection to a first operator network in at least two operator networks, pre-stored first information of a second operator network in the at least two operator networks and second information of the terminal in the second operator network to the first operator network, wherein the terminal is used to connect to the at least two operator networks, wherein the first operator network and the second operator network are networks provided by different operators, the first information is information for the first operator network to determine the second operator network, and the second information is information for the first operator network and the second operator network to determine the terminal; and
   determining a time-domain resource for disconnecting from the first operator network and performing an activity in the second operator network according to at least one of first configuration information sent by the first operator network and second configuration information sent by the second operator network after establishing a communication connection to the second operator network, wherein the first configuration information is generated by the first operator network according to the determined time-domain resource, and the second configuration information is generated by the second operator network according to the determined time-domain resource.

2. The method according to claim 1, further comprising:
   disconnecting from the first operator network and performing an activity in the second operator network in the time-domain resource.

3. The method according to claim 2, wherein the time-domain resource comprises a plurality of sub-resources, and disconnecting from the first operator network and performing an activity in the second operator network in the time-domain resource comprises:
   determining a target sub-resource among the plurality of sub-resources according to a type of the activity;
   disconnecting from the first operator network and performing an activity in the second operator network in the target sub-resource.

4. The method according to claim 2, further comprising:
   restoring a connection to the first operator network after the time-domain resource.

5. The method according to claim 1, wherein the type of the activity comprises at least one of:
   monitoring a paging message sent by the second operator network,
   responding to the paging message sent by the second operator network,
   measuring communication information of the second operator network,
   receiving a system message sent by the second operator network, and
   performing tracking area update in the second operator network.

6. A network switching resource determining apparatus, applied to a terminal, comprising:
   one or more processors; and
   a non-transitory computer-readable storage medium storing instructions executable by the one or more processors;
   wherein the one or more processors are configured to implement the method of claim 1.

7. The network switching resource determining apparatus according to claim 6, wherein the one or more processors are further configured to:
   disconnect from the first operator network in the time-domain resource; and
   perform an activity in the second operator network in the time-domain resource.

8. The network switching resource determining apparatus according to claim 7, wherein the time-domain resource comprises a plurality of sub-resources, and the one or more processors are further configured to:
   determine a target sub-resource among the plurality of sub-resources according to a type of the activity, and disconnect from the first operator network in the target sub-resource, and perform an activity in the second operator network.

9. The network switching resource determining apparatus according to claim 7, wherein the one or more processors are further configured to:
restore a connection to the first operator network after the time-domain resource.

10. A non-transitory computer-readable storage medium having computer executable instructions that, when executed by one or more processors, cause the one or more processors to implement the method of claim 1.

11. A method for configuring a network switching resource, applied to a first operator network, and comprising:
receiving first information of a second operator network sent by a base station, and sending second information of a terminal in the second operator network to the first operator network, wherein the first operator network and the second operator network are networks provided by different operators, the first information is information for the first operator network to determine the second operator network, and the second information is information for the first operator network and the second operator network to determine the terminal;
determining the second operator network according to the first information;
negotiating with the second operator network according to the second information to determine and record a time-domain resource;
generating first configuration information according to the time-domain resource, wherein the first configuration information is generated by the first operator network according to the time-domain resource; and
sending the first configuration information to the terminal, wherein the terminal disconnects from the first operator network and performs an activity in the second operator network in the time-domain resource.

12. The method according to claim 11, wherein the time-domain resource comprises a plurality of sub-resources, and negotiating with the second operator network according to the second information to determine and record a time-domain resource comprises:
negotiating with the second operator network according to the second information to determine a sub-resource corresponding to each type of the activity.

13. A network switching resource configuring apparatus, applied to a first operator network, comprising:
one or more processors; and
a non-transitory computer-readable storage medium storing instructions executable by the one or more processors;
wherein the one or more processors are configured to implement the method of claim 6.

14. The network switching resource configuring apparatus according to claim 13, wherein the one or more processors are further configured to:
negotiate with the second operator network according to the second information to determine a sub-resource corresponding to each type of the activity.

15. A non-transitory computer-readable storage medium having a computer executable instructions that, when executed by one or more processors, cause the one or more processors to implement the method of claim 11.

16. A method for configuring a network switching resource, applied to a second operator network, and comprising:
negotiating with a first operator network according to second information of a terminal in the second operator network to determine a time-domain resource, wherein the first operator network and the second operator network are networks provided by different operators, and the second information is information for the first operator network and the second operator network to determine the terminal;
generating second configuration information according to the time-domain resource, wherein the second configuration information is generated by the second operator network according to the time-domain resource; and
sending the second configuration information to the terminal, wherein the terminal disconnects from the first operator network and performs an activity in the second operator network in the time-domain resource.

17. The method according to claim 16, wherein negotiating with the first operator network according to the second information of the terminal in the second operator network to determine the time-domain resource comprises:
negotiating with the first operator network according to the second information to determine a sub-resource corresponding to each type of the activity.

18. A network switching resource configuring apparatus, applied to a second operator network, comprising:
one or more processors; and
a non-transitory computer-readable storage medium storing instructions executable by the one or more processors;
wherein the one or more processors are configured to implement the method of claim 9.

19. The network switching resource configuring apparatus according to claim 18, wherein the one or more processors are further configured to:
negotiate with a first operator network according to the second information to determine a sub-resource corresponding to each type of the activity.

20. A non-transitory computer-readable storage medium having a computer executable instructions that, when executed by one or more processors, cause the one or more processors to implement the method of claim 16.

* * * * *